United States Patent
Venkatesan et al.

(10) Patent No.: US 7,051,208 B2
(45) Date of Patent: *May 23, 2006

(54) TECHNIQUE FOR PRODUCING THROUGH WATERMARKING HIGHLY TAMPER-RESISTANT EXECUTABLE CODE AND RESULTING "WATERMARKED" CODE SO FORMED

(75) Inventors: Ramarathnam Venkatesan, Redmond, WA (US); Vijay Vazirani, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 10/970,425

(22) Filed: Oct. 21, 2004

(65) Prior Publication Data

US 2005/0144458 A1    Jun. 30, 2005

Related U.S. Application Data

(63) Continuation of application No. 10/880,213, filed on Jun. 29, 2004, which is a continuation of application No. 09/525,694, filed on Mar. 14, 2000, now Pat. No. 6,829,710.

(51) Int. Cl.
*H04L 9/00* (2006.01)
(52) U.S. Cl. .................... 713/176; 713/179; 713/189; 713/190; 713/194
(58) Field of Classification Search ............... 713/176, 713/179, 189, 190, 194
See application file for complete search history.

(56) References Cited

U.S. PATENT DOCUMENTS 5,748,741 A    5/1998   Johnson et al.
6,192,475 B1   2/2001   Wallace et al.
6,594,761 B1   7/2003   Chow et al.
6,668,325 B1   12/2003  Collberg et al.

FOREIGN PATENT DOCUMENTS

WO    WO 99/64973    12/1999

OTHER PUBLICATIONS

Collberg et al, "Software Watermarking: Models and Dynamic Embeddings", 1999, ACM, pp. 311-324.
Qu et al, "Analysis of Watermarking Techniques for Graph Coloring Problem", 1998, ACM, pp. 190-193.

*Primary Examiner*—Gilberto Barron
*Assistant Examiner*—Jung W. Kim
(74) *Attorney, Agent, or Firm*—Lee & Hayes, PLLC

(57) ABSTRACT

Apparatus and an accompanying method, for forming and embedding a highly tamper-resistant cryptographic identifier, i.e., a watermark, within non-marked executable code, e.g., an application program, to generate a "watermarked" version of that code. Specifically, the watermark, containing, e.g., a relatively large number of separate executable routines, is tightly integrated into a flow pattern of non-marked executable code, e.g., an application program, through randomly establishing additional control flows in the executable code and inserting a selected one of the routines along each such flow. Since the flow pattern of the watermark is highly intertwined with the flow pattern of the non-marked code, the watermark is effectively impossible to either remove from the code and/or circumvent. The routines are added in such a manner that the flow pattern of resulting watermarked code is not substantially different from that of the non-marked code, thus frustrating third party detection of the watermark using, e.g., standard flow analysis tools. To enhance tamper-resistance of the watermarked code, each such routine can provide a pre-defined function such that if that routine were to be removed from the marked code by, e.g., a third party adversary, then the marked code will prematurely terminate its execution.

26 Claims, 8 Drawing Sheets

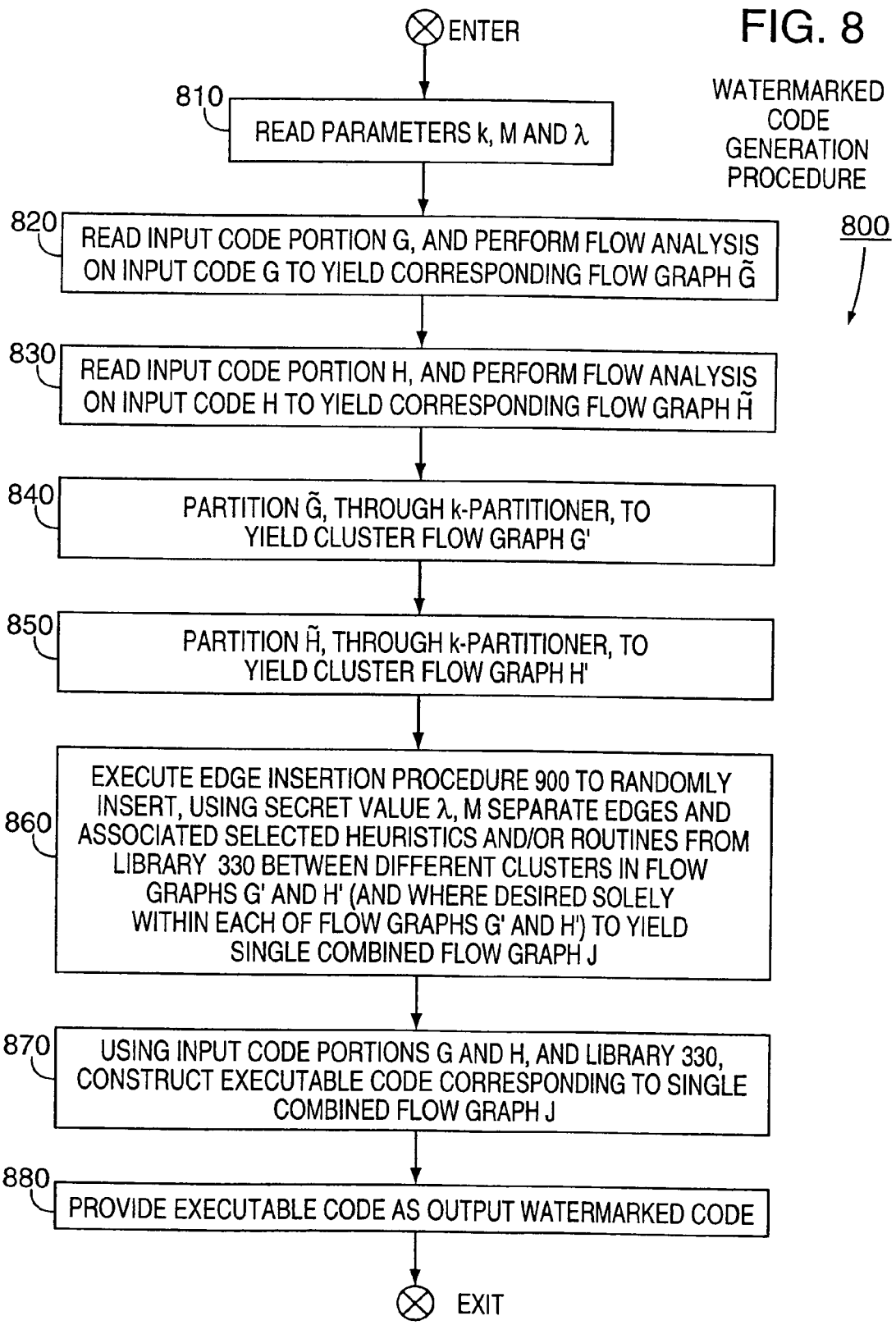

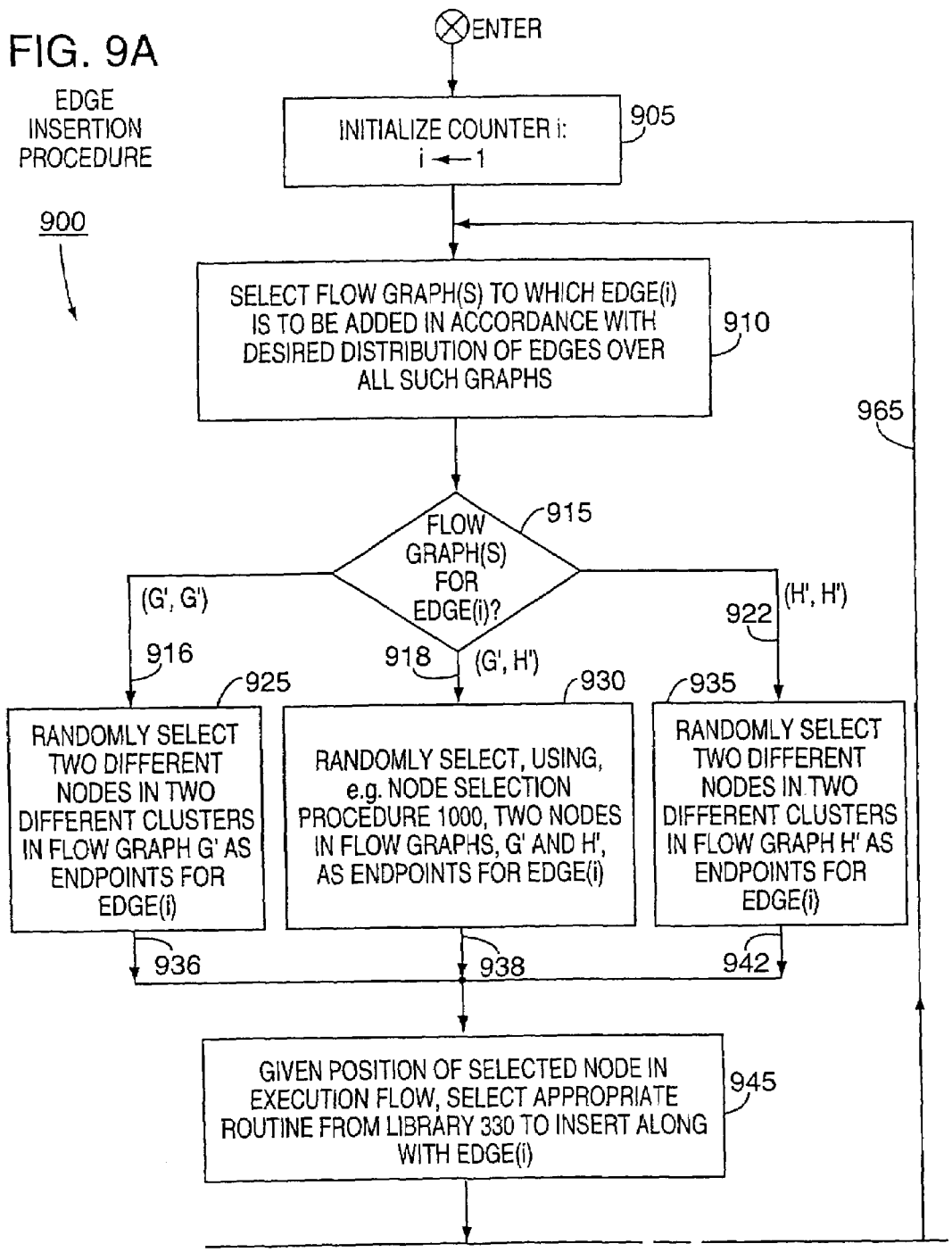

NODE SELECTION PROCEDURE

TECHNIQUE FOR PRODUCING THROUGH WATERMARKING HIGHLY TAMPER-RESISTANT EXECUTABLE CODE AND RESULTING "WATERMARKED" CODE SO FORMED

RELATED APPLICATIONS

This application is a continuation of U.S. patent application Ser. No. 10/880,213, filed Jun. 29, 2004, the disclosure of which is incorporated by reference herein. This application claims priority to U.S. patent application Ser. No. 09/525,694, filed Mar. 14, 2000 now U.S. Pat. No. 6,829,710, the disclosure of which is incorporated by reference herein.

BACKGROUND OF THE DISCLOSURE

1. Field of the Invention

The invention relates to a technique including both apparatus and an accompanying method, for forming and embedding a hidden highly tamper-resistant cryptographic identifier, i.e., a watermark, within non-marked computer executable code, e.g., an application program, to generate a "watermarked" version of that code. This technique can also be used to tightly integrate, in a highly tamper-resistant manner, other pre-defined executable code, such as security code, as part of the watermark, into the non-marked code in order to form the watermarked code.

2. Description of the Prior Art

Over the past decade or so, personal computers (PCs) have become rather ubiquitous with PC hardware and software sales experiencing significant growth. However, coincident with an ever widening market for PCs, unauthorized copying of PC software, whether it be application programs or operating systems, continues to expand to rather significant proportions. Given that in certain countries sales lost to such copying can significantly exceed legitimate sales, over the years software manufacturers have attempted to drastically reduce the incidence of unauthorized copying though, practically speaking, with only limited success.

One such technique, probably one of the oldest techniques used and usually rather ineffective, is simply to append a copyright and other legal proprietary rights notices to object code as distributed on mass (magnetic or optical) media. The intention in doing so is to deter unauthorized copying by simply placing a third party on notice that a copy of the program, embodied by that code, is legally protected and that its owner may take legal action to enforce its rights in the program against that party to prevent such copying. These notices can be readily discovered in program code listings and simply excised by the third party prior to copying and distributing illicit copies. Other such notices can be excised by a third party adversary from the software media itself and the program packaging as well. Though these notices are often necessary in many jurisdictions to secure full legal remedies against third parties, in practice, these notices have provided little, if any, real protection against third party copying.

Another technique that is recently seeing increasing use is to require a PC, on which the program is to execute, to hold a valid digital "certificate" provided by the manufacturer of the program. The certificate will typically be loaded as a separate step during manufacture of the PC. During initialization, the program will test the certificate and confirm its authenticity and validity. If the certificate is authentic and valid, the program will continue to execute; otherwise, the program will simply terminate. Unfortunately, the certificate and associated testing routines are often very loosely bound to the remainder of the program code. Currently available software analysis tools can display execution flow among program instructions in a program under test. Consequently, with such tools, a programmer, with knowledge of an operational sequence implemented by the program and by analyzing a flow pattern inherent in that program, as it executes, can readily discern the program code that implements a certificate testing function. Once this code is detected, the programmer can readily excise that portion from the program itself and simply modify the remaining program code, by, e.g., by inclusion of appropriate jump instruction(s), to compensate for the excised portion; thus, totally frustrating the protection which the certificate was intended to provide against unauthorized copying. Once having done so, a third party adversary can then produce and distribute unauthorized, but fully executable, copies of the program free of all such protection. Thus, in practice, this approach has proven to be easily compromised and hence afforded very little, if any, real protection against illicit copying.

Other techniques have relied on using serialized hardware or other hardware centric arrangements to limit access to a program to one or more users at one particular PC and preclude that program from being loaded onto another PC. Generally, these techniques, often referred to as "copy protect" schemes and which were popular several years ago, relied on inserting a writeable program distribution diskette, such as a floppy diskette, into a PC and then, during execution of an installation process from that diskette, have that PC store machine specific data, such as a hardware identification code, onto the diskette. Thereafter, during each subsequent installation of the program, an installation process would check the stored machine specific data on the installation diskette against that for a specific PC on which the program was then being installed. If the two pieces of data matched, installation would proceed; otherwise, it would prematurely terminate. Unfortunately, such schemes, while generally effective against unauthorized copying, often precluded legitimate archival copying as well as a legitimate installation of the program on a different PC. In view of substantial inconveniences imposed on the user community, such "copy protect" schemes quickly fell into disuse and hence where basically abandoned shortly after they first saw widespread use. Moreover, any such technique that relies on storing information on the distribution media itself during program installation is no longer practical when today software is distributed on massive read-only optical media, such as CDROM or, soon, digital video disk (DVD).

Therefore, given the drawbacks associated with copy protect and certificate based schemes, one would think that embedding an identifier of some sort into a program, during its manufacture and/or installation and subsequently testing for that identifier during subsequent execution of an installed version of that program at a user PC, would hold promise.

However, for such an identifier based approach to be feasible, a need exists in art for an identifier, such as a watermark, that can be tightly integrated into a program itself such that the watermark would be extremely difficult, if not effectively impossible, for a third party to discern, such as through flow analysis, and then circumvent, such as by removal.

In particular, such a watermark could be embedded in some fashion into a non-marked program. Then, subsequently, at runtime of an installed version of that program at a user PC, a "secret" key(s) based cryptographic process could be used to reveal the presence of and test the watermark. The key(s) would be separately stored down, to the PC, as a software value(s). If the correct watermark were then detected, execution of the installed program would continue; else, execution would halt. Fortunately, such an approach would likely impose essentially no burden on, and preferably be totally transparent to, the user, and not frustrate legitimate copying.

If such an identifier could be made sufficiently impervious to third party detection and tampering, then advantageously its use, with, for example, such an approach, may well prove effective, in practice, at reducing unauthorized third party copying.

SUMMARY OF THE INVENTION

Our present invention advantageously satisfies this need and overcomes the deficiencies in art through a watermark, containing, e.g., a relatively large number of executable routines, that is tightly integrated into a flow pattern of non-marked executable code, e.g., an application program, through randomly establishing additional control (execution) flows in the executable code and inserting a selected one of the routines along each such flow. Since a resulting flow pattern of the watermark is highly intertwined with (tightly spliced into) the flow pattern of the non-marked code, the watermark is effectively impossible to either remove from the code and/or circumvent. Furthermore, the code for the routines themselves is added in such a manner that the flow pattern of resulting "watermarked" code is not substantially different from that of the non-marked code. Hence, the watermark is also extremely difficult for a third party adversary to discern using, e.g., standard flow analysis tools and human inspection.

Advantageously, to enhance tamper-resistance of the watermarked code, each routine, that constitutes a portion of the watermark, can provide a pre-defined function such that, if that routine were to be removed from the marked code by, e.g., the third party adversary, then the marked code will prematurely terminate its execution.

In accordance with our specific inventive teachings, unmarked executable code which forms, e.g., an application program that is to be watermarked is first converted, using a conventional software flow analysis tool, into its corresponding flow graph. Predefined security code, typically constituting specific predetermined executable software code, is also converted, through use of the same tool, into its corresponding flow graph. The security code can itself constitute, for example: specific "watermark" code, i.e., executable code having as its primary, if not sole, purpose to form a portion of a watermark (i.e., distinct from application program itself); a complete image of the entire application program itself; or just a portion of that program. In that regard, the unmarked executable code and the security code can each be formed of a different half of a common application program.

Thereafter, each of the flow graphs is k-partitioned to yield cluster flow graphs G' and H', respectively (where k is a pre-defined integer, such as illustratively 1000 for a large application program then being watermarked), each having k clusters of nodes (each being a partition). M edges (links) (where M is typically a large pre-defined integer, such as illustratively 500,000 for that application program) are collectively inserted between corresponding pairs of randomly selected nodes in: (a) graphs G' and H'; and, where desired, (b) different clusters solely in graph G', and/or (c) different clusters solely in graph H'. For each edge, a routine is selected from a pre-defined library, based on, e.g., minimizing adverse affects on program flow, and its designation is inserted along that edge in the flow graph(s), specifically at one of the nodes associated with that edge. All the edges collectively and effectively splice clustered flow graphs G' and H' together into a single combined flow graph. Executable code is then produced which corresponds to that depicted in the single combined flow graph. The watermark is collectively defined by the routines and edges that have been inserted into the unmarked code.

One illustrative heuristic for selecting each specific pair of nodes, in, e.g., cluster graphs G' and H' that are to be joined by an edge, is as follows. First, randomly pick a node, U, in graph G'. With λ being pre-defined as equaling (a number of edges that are to transit between G' and H')/(a number of edges connected to U), then, with a probability of 1-λ, randomly choose a node, Y, in graph H'. Then, with a probability of λ, randomly choose a node, Z other than U, in graph G'. Finally, provide, as output, designations of nodes Y and Z as a nodal pair.

During subsequent edge insertion, connect the nodes for that edge together, e.g., nodes Y and Z, so as to insert an edge extending between cluster flow graphs G' and H'. Based on proper program flow, insert an appropriate routine from the library along that edge and at an appropriate node, in a graph, for that pair. Repeat these node selection and insertion steps until all M edges and designations for associated routines are collectively added to cluster graphs G' and H' so as to fully splice both graphs and associated routines into a single combined flow graph. Parameters k, M and λ are preferably kept in secret.

Each of these routines is predetermined, usually quite compact, requires relatively little execution time and executes a pre-defined, often self-contained operation, such as, e.g., computing a cryptographic key for use in printing or decoding a variable, or decrypting a ciphered variable. Each of the operations is chosen so as not to require much processing time; thus, not noticeably degrading execution of the watermarked program. Collectively, the routines that are inserted are such that, for proper execution of the watermarked program, they must all be executed and, to a certain extent, in a given sequence. In that regard, if any one or more of these routines is removed from the watermarked program, such as by a third party adversary, that program will gracefully terminate its execution.

To further frustrate its detection, the code for all the inserted routines is collectively scattered approximately uniformly throughout the "watermarked" program as that program is being constructed from its combined flow graph. In this manner, the routines will not be centralized in any one portion of the watermarked program. Furthermore, each of these routines is written with standard code "obfuscation" techniques to further camouflage their functionality.

Advantageously, as a feature, the present invention can securely watermark any executable code, whether it forms, e.g., an application program, an operating system (O/S) or a software module.

BRIEF DESCRIPTION OF THE DRAWINGS

The teachings of the present invention can be readily understood by considering the following detailed description in conjunction with accompanying drawings, in which:

FIG. 8 depicts a high-level flowchart of watermarked code generation procedure 800 that is executed by computer system 700 to implement our present invention;

FIG. 9 depicts correct alignment of the drawing sheets for FIGS. 9A and 9B;

FIGS. 9A and 9B collectively depict a high-level flowchart of edge insertion procedure 900 that is executed as part of procedure 800 shown in FIG. 8.

To facilitate understanding, identical reference numerals have been used, where possible, to designate identical elements that are common to the figures.

DETAILED DESCRIPTION

After considering the following description, those skilled in art will clearly realize that the teachings of our present invention can be utilized in a wide range of applications for generating and incorporating a pre-defined watermark into nearly any type of computer executable code, i.e., a non-marked program (or a portion of it), or for that matter into any software object, such as an audio file, containing, e.g., music, or a video file, containing, e.g., a movie, that is to be watermarked. Through this technique, substantial tamper resistance can be imparted to the marked object itself; and other executable code, such as a pre-defined executable security code or a pre-defined executable, can be tightly integrated into the non-marked object in a manner which assures that a resulting watermarked object, which contains both the non-marked object and the watermark, is itself substantially tamper-resistant.

To clearly elucidate the invention and facilitate reader understanding, by way of background, we will first very briefly describe well known, though separate concepts of watermarking and program flow analysis. Thereafter, we will discuss our present invention in the context of its use for imparting a watermark, specifically implemented through pre-defined executable code, into a non-marked application program intended for subsequent execution on a personal computer (PC). During the course of this discussion, we will address the overall constituents of the watermark and its variations.

A. Overview

1. Watermarking

Figure 1:
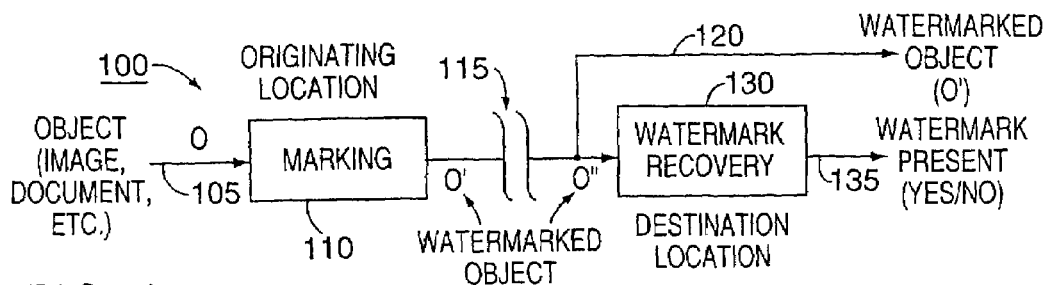
FIG. 1 depicts a simplified high-level block diagram of conventional watermarking process 100.

FIG. 1 depicts a simplified high-level block diagram of conventional watermarking process 100. In essence, an object, O, to be protected, whether it be a printed image, a document, a piece of paper currency or some other such item, is applied, as symbolized by line 105, to marking process 110 situated at an originating location. This process creates a watermark and embeds it in the object to create a watermarked object, O'. The watermarked object is then eventually transported through insecure channel 115, whether it be, e.g., transit through a public carrier or, as in the case of currency, public distribution, to a destination location. In a typical situation, a malicious attacker may intercept watermarked object O', as it travels through channel 115, and try to remove the watermark from O' by subjecting O' to his or her own transformations. Thus, an object, O" ultimately received at a destination location, may not be exactly the same, as what it was, i.e., O', when sent. At the destination, the watermarked object O" (if a third party attempted to modify the object) or O' (if the object was not modified) is subjected to watermark recovery process 130 which attempts to recover the watermark from the object and, based on a result of the recovery process, indicates, as symbolized by output line 135, whether the watermark is present or not in the relevant object. This indication can be used to signify whether the received watermark object, then situated, as symbolized by line 120, at the destination is legitimate or not. Since the legitimacy of the document is directly governed by the security of the watermark, the watermark itself must be as difficult as possible for a third party to copy or alter.

2. Program Flow Analysis

Figure 2:
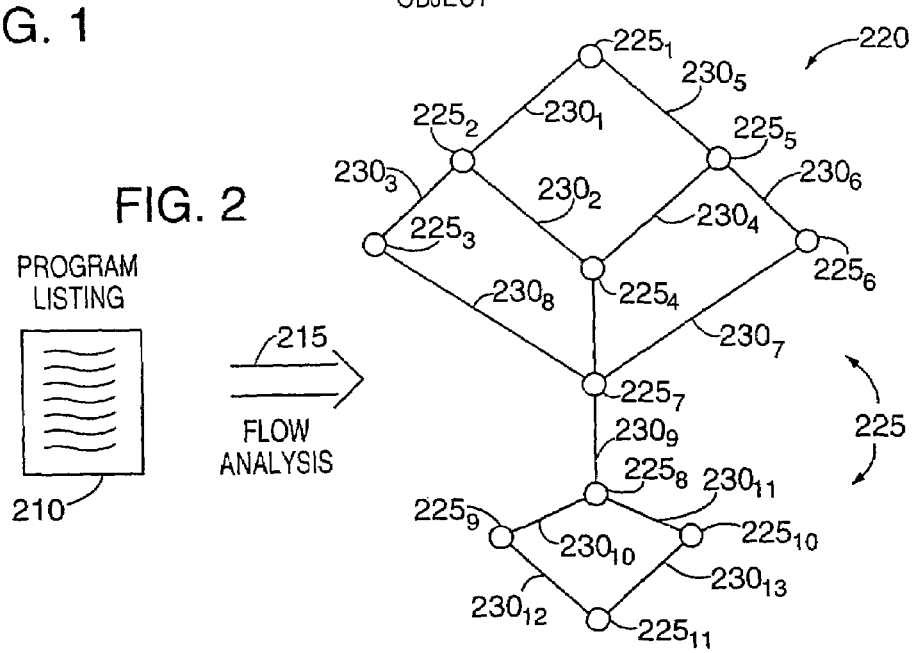
FIG. 2 depicts a simplified and illustrative flow graph produced through conventional program flow analysis.

FIG. 2 depicts a simplified and illustrative flow graph produced through conventional program flow analysis.

In essence and to the extent relevant, flow analysis, as symbolized by arrow 215, transforms executable code, such as program listing 210, into a connection graph, such as graph 220. Each node within the graph represents a separate instruction in the code, with typically a first such instruction encountered in the code represented by an uppermost ("root") node. Here, separate instructions in listing 210 are graphically represented by nodes 225 having separate illustrative nodes $225_1$, $225_2$, $225_3$, $225_4$, $225_5$, $225_6$, $225_7$, $225_8$, $225_9$, $225_{10}$ and $225_{11}$. Execution flow from one instruction to another is indicated by a line (commonly and hereafter referred to as an "edge" or link) that connects the two nodes representing these particular instructions. As shown, instructions represented by nodes $225_1$ and $225_2$ are connected by edge $230_1$, thereby indicating that execution flow transits between these nodes, e.g., from the instruction represented by node $225_1$ to that represented by node $225_2$. Similarly, nodes $225_2$ through $225_{11}$, are collectively connected by edges $230_2$ through $230_{13}$. The specific nodes and their interconnecting edges, which form a collective pattern, graphically depict the execution flow among the illustrative instructions in associated executable code, here represented by nodes $225_1$ through $225_{11}$ within program listing 210.

Illustrative graph 220 is quite small and greatly simplified. In actuality, with relatively large application programs, corresponding flow graphs can become extremely large, with a substantial number of nodes and edges, and graphically depict highly complex execution flows.

Advantageously, the present invention is independent of any particular technique through which flow analysis is effectuated and, in all likelihood, will properly function with any one of a wide variety of techniques provided that only one such technique is consistently used throughout any single implementation of the present invention. Hence, for brevity, we will omit all details of how flow analysis is actually performed to yield a corresponding flow graph for associated executable code.

In a similar way to the program control flow graph, one can assign a data flow graph to given code. Clearly, our invention can function with any type of flow graph assigned to such code, regardless of whether that graph is associated with data and/or control flow.

B. Inventive Software Watermarking Technique

1. Process Overview

Figures 3, 5:
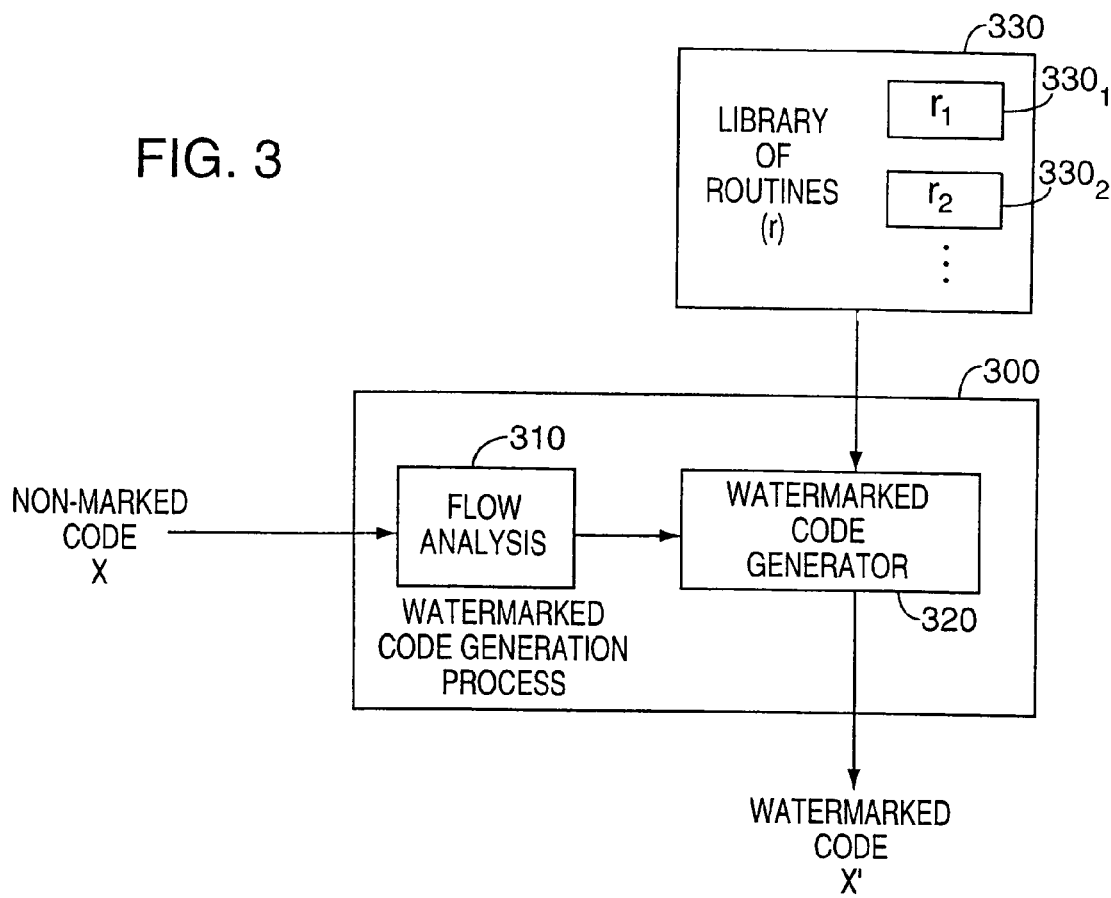
FIG. 3 depicts a simplified high-level block diagram of our inventive technique for securely watermarking software.
FIG. 5 depicts table 500 of illustrative portions of a code image that can be applied as separate inputs to our present invention for watermarking that entire code image.

FIG. 3 depicts a simplified high-level block diagram of our inventive technique for securely watermarking software.

In essence, our present invention produces a watermark, illustratively containing a large number of separate executable routines, that is tightly integrated into a flow pattern of non-marked executable code, e.g., an application program, through randomly establishing additional execution (control) flows in the executable code and inserting a selected one of the routines along each such flow. Our invention can generate and embed such a watermark in substantially any executable code, such as an application program, an operating system (O/S) or a software module. For purposes of illustration, we will assume, as noted above, this code is an application program for execution on a PC.

Specifically, as shown, unmarked executable code, X, that forms, e.g., an application program that is to be watermarked, is applied to watermark code generation process 300. Process 300 first generates, through conventional flow analysis tool 310 corresponding flow graphs for this code. In actuality, this process, as implemented, in a PC (or other computer system) will generate a representation of each such graph. For simplicity, the term "graph", as used herein, is now defined to encompass not only the graph itself but also all digital and other electronic representations thereof. As will be described below in conjunction with FIGS. 4 and 5, code X can contain not only the non-marked application code itself but also other executable code, such as pre-defined security code, that is to be spliced into the non-marked application code.

Once the flow graphs are generated, those graphs are applied to watermark code generator 320. Generator 320 randomly selects pairs of nodes in both of the flow graphs, inserts an edge (i.e., to establish an execution flow) between the nodes in each pair and also inserts a pre-defined routine (both collectively viewed as an executable "procedure") ($r_i$) from library 330 (having routines $330_1$, $330_2$, . . . collectively labeled as r) at an appropriate one of the nodes in each such pair; thus, ultimately forming a single combined flow graph produced by generator 320. By this we mean the following. Code segments associated with routine $r_i$ are added to the original program X so that the behaviour of the program in terms of its input and output as well as functionality are almost the same as the original program. Further, these segments are designed to appear as if they are a normal part of original code X so that these segments are not readily apparent, unless attacker expends considerable effort to understand the code and its behaviour. An illustrative implementation could be that, e.g., routine $r_{i+1}$ is called by some code to alter data or variables (or code) in some segment and later after some execution routine $r_{i+2}$ is called to reverse this change. Without the reversal, the watermarked program would fail to operate normally. The flow graphs of the code for the inserted routine may encode additional information which itself may also be a part of the watermark. The information in the watermark may also be in various components of H', which is discussed below.

Now, we will describe an exemplary implementation of how one may embed information in a flow graph that has a distinguished start node and where the nodes are canonically labeled using some scheme (e.g., by integers, short binary strings or elements from a finite field). From the distinguished node, one may traverse the graph using any one of many conventional traversal schemes which visit all the nodes in a predetermined sequence. Illustrative ways of doing so include depth first search and breadth first search. Here, we may modify nodal ordering using a pseudo-randomized strategy. For example, where the traversal is at a particular node and when deciding which node to visit next, some possible candidates may be pseudo randomly selected for omission. This provides some resilience inasmuch as an attacker changing the code and associated flow graph may not know which candidates are omitted and included. Further, the non-omitted candidates may be pseudo randomly ordered and then visited in that order. Any such traversal will yield a sequence (order) of nodes visited, and their nodal labels in that order will yield a parameter, i.e., a specific code (so as not to confuse the reader, the term "code" here is being used in a cryptographical sense and not referring to software code) that represents the graph. We may use more than one traversal. The parameter is likely to be distinct for each graph and its canonical labeling. To further enhance the resilience, an error correction procedure may be applied over this parameter, for example, using majority logic decoding procedures or algebraic coding procedures. In the latter case, the graphs and the labeling, and the pseudo-random choices may need to be pre-configured so that the error correction may be applied meaningfully. Then, the output of a decoding process (or a decryption process using a cipher that employs a key derived from the watermark key) would be a message, decrypted using a secret key that is embedded in the graph. The distinguished node may not be easily identifiable by an attacker who does not know the secret, whereas given the secret key one can readily identify the distinguished node. In particular, one method to accomplish this would be that while in the detection phase one tries each possible candidate node and tries to find an associated code of a subgraph of certain fixed size that contains that node as a root. If a resulting derived parameter appears meaningless or an attempt to recover the parameter fails for some reason, one concludes there are no watermarks; else, we conclude that there is a watermark. Examples of such parameters (cryptographic codes), which are well known in coding theory are described in, e.g., J. H Van Lint, *Introduction to Coding Theory*, (© 1998, Springer Verlag).

Furthermore, any pseudo-random number generator needs a secret random key which may be derived from a key used for watermarking using any one of many conventional ways. For example, to derive numeric key $k_1$ from secret key S, we can use $k_1$=HASH(S,1), where HASH may be a collision resistant hash function such as MD5 or SHA1. For a description of these functions, the reader is referred to A. J. Menezes et al, *Handbook of Applied Cryptography*, (© 1997; CRC Press, LLC).

The watermark is collectively defined by the routines and edges (the latter collectively implementing a pattern of associated execution flows) that have been added to the unmarked code and, where used, any cryptographic parameter that is detected from corresponding graphs.

Thereafter, generator 320, using the unmarked code and code for routines r, assembles the marked executable code, for the program, from that represented by the combined flow graph. The resulting marked executable code is watermarked code X', here being a watermarked application program.

Since the flow pattern of the watermark is highly intertwined with (tightly spliced into) the flow pattern of the non-marked code, the watermark is effectively impossible to either remove from the watermarked code and/or circumvent. Furthermore, since the code for the routines themselves is added in such a manner that the flow pattern of resulting watermarked code is not substantially different from that of the non-marked code, the watermark is also extremely difficult for the third party adversary to discern using, e.g., standard flow analysis tools.

To enhance tamper-resistance of the watermarked code, each routine, that constitutes a portion of the watermark, can provide, as discussed above, a pre-defined function such that if that routine were to be removed from the marked application code by, e.g., a third party adversary, then that application will prematurely terminate its execution.

Each of these routines is pre-defined, as noted above. They are usually quite compact in size (i.e., contain a relatively small number of instructions) and executes a pre-defined "small", often self-contained operation (task), such as, e.g., computing a cryptographic key for use in printing or decoding a variable, decrypting a ciphered variable, encrypting a variable or data value prior to either its use or storage, and/or validating either a stored parameter or an input value. Each of these operations is chosen so as not to require much processing time; thus, not noticeably degrading execution of application program itself. Multiple routines could be inserted to provide a combined functionality. In that regard, one such routine can be inserted in the program flow to encrypt a plaintext data value into an enciphered value, and another routine could be inserted into that flow at an appropriate location to decrypt the enciphered value immediately before application program needs to use the plaintext data value. Collectively, the routines are preferably such that, for proper execution of the marked program, they must all be executed and, to a certain extent, in a given sequence. In that regard, if any one or more of these routines is removed from the watermarked application program, such as by a third party adversary, then that program will gracefully terminate its execution.

To further frustrate its detection, the code for all the inserted routines is collectively scattered approximately uniformly throughout the watermarked application program as generator 320 constructs that program from the combined flow graph. In this manner, the routines will not be centralized in any one portion of the watermarked program. Furthermore, each of these routines is written with conventional standard code "obfuscation" techniques to further camouflage their functionality.

2. Detailed Process Depiction

Figure 4:
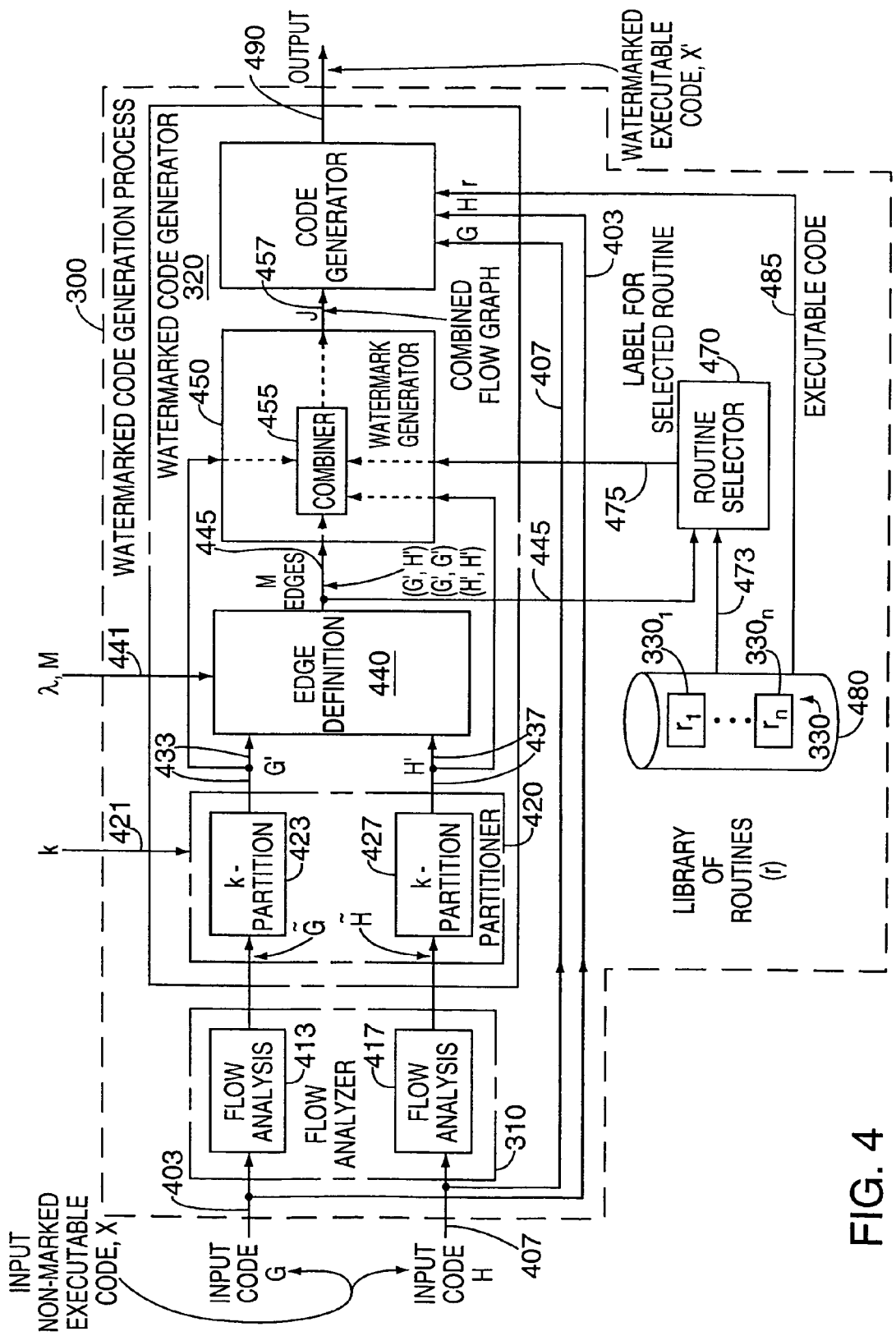
FIG. 4 depicts a detailed block diagram of our inventive technique shown in FIG. 3.

With above in mind, FIG. 4 depicts a detailed block diagram of our inventive technique, with FIG. 5 depicting table 500 of illustrative code portions that can be applied as separate inputs to our technique. To simplify understanding, the reader should simultaneously refer to both of these figures throughout the following discussion.

Non-marked executable code, e.g., an application program, that is to be watermarked through process 300 is split into two portions and separately applied as input code portions G and H on input lines 403 and 407, respectively. These portions, as shown in table 500, can illustratively comprise two identical images of the same non-marked code, two different halves of the same non-marked code, and a complete image of that code and the security code. Since the partitioning of the non-marked code is not critical, other fractional partitioning of the non-marked code can be used instead, such as illustratively ¼ and ¾ of the image for portions G and H, respectively, and with or without inclusion of the security code. The security code can also contain specific "watermark" code, e.g., executable code distinct from the non-marked application program, which, as its primary, if not sole, function, forms a portion of the watermark (or, as described below, provides other functionality totally apart from that of application program). The security code can also be duplicated or fractionally partitioned, as desired, across both code portions G and H.

Within process 300, code portions G and H are applied to flow analyzer 310 and specifically subjected to corresponding flow analysis operations 413 and 417, to yield corresponding flow graphs $\tilde{G}$ and $\tilde{H}$, respectively. Both flow analysis operations employ the same conventional flow analysis technique. Both of these flow graphs are then routed to partitioner 420 where flow graphs $\tilde{G}$ and $\tilde{H}$ are k-partitioned, via corresponding k-partitioning operations 423 and 427, to yield cluster flow graphs G' and H', respectively. A k-partitioning algorithm decomposes its input into k pieces where each piece has approximately a same number of nodes, and a number of edges between the pairs of pieces is as small as possible and approximately the same. It can be heuristically assumed that a graph over the partitioning has a fairly rich structure, for example, as a randomly generated graph having a same number of nodes and edges. In fact, any partitioning of the original graph will suffice for use with our invention, with that described herein being only one such example. Both of the k-partitioning operations are identical and can be implemented by any one of a wide variety of conventional partitioning techniques. Each of the resulting cluster flow graphs contains k clusters (each cluster being a "partition") of nodes where k is a pre-defined "secret" value (illustratively 1000 for a large application program having tens of Mbytes of instructions though the exact value of k is not critical) provided, as symbolized by line 421, as input to process 300. Partitioning the flow graphs in this fashion renders the resulting cluster flow graphs more manageable over flow graphs $\tilde{G}$ and $\tilde{H}$ while increasing complexity of the cluster graphs over that of the non-partitioned flow graphs. Generally, cluster size (inverse of k) is selected such that interaction between different clusters, during program execution as shown by the corresponding flow graphs, is relatively low. An identical cluster size is used by partition operations 423 and 427.

Resulting cluster flow graphs G' and H' are then routed, as symbolized by lines 433 and 437, as input to edge definition operation 440. This operation establishes edges between nodes in different clusters in graphs G' and H', and, where desired, different clusters solely in graph G' and solely in graph H'. To so do, operation 440 randomly selects, based on secret input parameter $\lambda$ (where $0 \leq \lambda \leq 1$), M pairs of nodes, collectively spanning the desired clusters, and inserts an edge linking the nodes in each such pair, where M is also a "secret" value (typically a large pre-defined integer, such as illustratively 500,000 for a large application program having on the order of tens of Mbytes of instructions though the exact value of M is not critical). An illustrative algorithm for selecting these nodes, based on $\lambda$, will be described below in conjunction with FIG. 10. These nodal pairs will include those pairs having one node in a cluster in graph G' with the other node in a cluster in graph H' and, if desired, those pairs with both nodes in different clusters solely within graph G' and/or both nodes solely within different clusters within graph H'.

As each edge is established by operation 440, designations of the nodes associated with that edge are applied both to watermark generator 450 and to routine selector 470. Selector 470, given the location of each of these nodes within the execution flow of application program, will select an appropriate routine from library 330(r), specifically routines $r_1$ (also designated $330_1$), . . . , routine $r_n$ (also designated $330_n$) that is to be inserted along that edge and a specific node on that edge at which that routine is to be inserted. The routines so inserted alter the data or variables locally and create data dependencies that can not be easily analyzed with a data flow analysis program. For example, routine $r_1$, inserted in G' may place a call (and cause data dependencies using a random looking but efficiently inverted operation) to a copy of routine $r_2$ inserted in H' where this call is associated with an edge inserted, as described below, from G' to H'. A variable altered in $r_2$ may be subject to a transformation that undoes that alteration, but also in an easily inverted but random looking operation. For example, routine $r_3$ may compute a check-sum of a predefined code segment and write that sum into a variable in another segment where, e.g., routine $r_5$ is inserted (routine $r_3$ may also check it against a given value to see if the pre-defined code segment has been altered). A label (or other programming designation) of the selected routine is applied, as symbolized by line 475, by selector 470, to one input of watermark generator 455. The selected routine and the specific node at which that routine is to be inserted are such that the inserted routine will impart minimal, if any, adverse affect on execution of application program at that point in the program flow. In addition, since there are likely to be far fewer routines in library 330 than there are edges inserted into graphs G' and H', each routine within library 330 is selected approximately the same number of times for insertion into the non-marked application program.

Generator 450, in addition to receiving, as input, the label of the selected routine, also receives, as symbolized by line 445, for each inserted edge, identification of the nodes for that edge, and, as symbolized by lines 433 and 437, cluster flow graphs G' and H'. With this input information, generator 450 inserts the edge into cluster flow graphs G' and H' (or either one of these graphs as appropriate) to span the nodal pair and also inserts the selected routine at one of these two nodes. The insertion process is simplistically represented by combiner 455. All the edges collectively and effectively splice the two clustered flow graphs G' and H' together into a single combined flow graph J which appears at an output of generator 450 and is routed, as symbolized by line 457, to code generator 460. Executable code is then produced, by generator 460, which corresponds to that depicted in the combined flow graph J. Generator 460 is conventional in nature. In essence, generator 460, in response to actual code for program portions G and H, appearing on respective lines 403 and 407, and the code for all the selected routines appearing on line 485, completely assembles executable code to fully implement the flow depicted in combined flow graph J and thus produce, on output line 490, a new, though marked, executable version, X', of application program. To frustrate third party detection of any of the inserted routines, generator 460 distributes associated code for these routines approximately uniformly throughout the marked program such that the flow patterns for the marked and non-marked versions of application program do not substantially differ from one another.

As noted above, the watermark is collectively defined by the routines and edges (the edges collectively implementing a pattern of associated execution flows) that have been added to the unmarked code and, when used, any parameter (cryptographic code) that is detected from corresponding graphs using, e.g., the procedures (e.g., with or without error correction) described above. By virtue of the manner through which the edges and routines are inserted as well as a relatively large number of such inserted edges, the resulting flow pattern for the marked program is sufficiently complex such that the watermark can not be readily discerned by a third party adversary.

Figure 6:
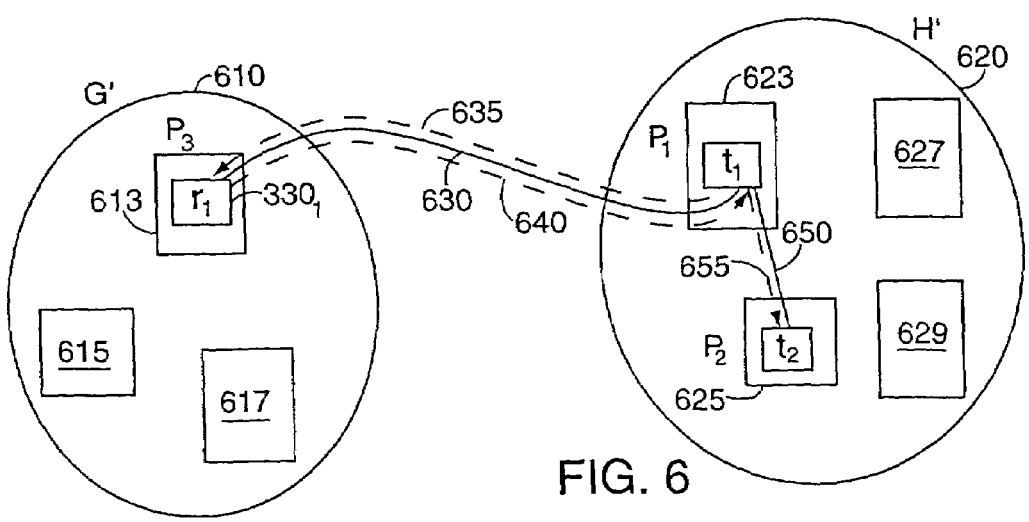
FIG. 6 depicts illustrative edge and associated routine insertion in cluster flow graphs G' and H' that can arise from use of our present inventive technique, and resulting execution (control) flow among various routines, one of which having been inserted.

To fully appreciate resulting execution (control) flow among various inserted routines, consider FIG. 6. This figure depicts illustrative edge and associated routine insertion in cluster flow graphs G' and H', and resulting control flow among various inserted routines. For simplicity, this figure only shows one inserted edge; though, in actuality, a considerable number of edges will be inserted in a non-marked application program.

Graphs G' (also denoted 610) and H' (also denoted as 620) contain illustrative clusters 613, 615 and 617; and 623, 625, 627 and 629, respectively. For simplicity, only a few of the clusters in each graph are explicitly shown. Each of these clusters, excluding the code for associated routine, represents a relatively large block of code in the non-marked application program. Specifically, clusters 623, 625 and 613 represent code blocks $P_1$, $P_2$ and $P_3$, respectively.

Assume that watermark generator 450 (see FIG. 4) has inserted, as shown in FIG. 6, routine $r_1$ (also denoted as $330_1$) within code block $P_3$, and that routines $t_1$ and $t_2$ located in code blocks $P_1$ and $P_2$, respectively, are preexisting within the non-marked application program. Execution would normally flow in the non-marked application program itself, without any diversion, via edge 650, just from routine $t_1$ directly to routine $t_2$.

Edge definition operation 440 (see FIG. 4) has inserted edge 630, as shown in FIG. 6, that spans a nodal pair having separate selected nodes within G' and H' and specifically one node, in that pair, within code block 613 and another node, in that pair, in code block 623. Here, as is typical, executable code for routine $r_1$ is inserted at a node, in the pair and in block $P_3$, remote from the other node, in the pair and located in block $P_1$, situated within a normal execution flow of the non-marked application program. As such, execution will flow from routine $t_1$ in block $P_1$, via edge 630 and in a direction indicated by dashed line 635, to routine $r_1$ in block $P_3$ and, once this routine has completed its execution, will return, along this edge and in a direction shown by dashed line 640, back to block $P_1$. From there, execution will follow its normal flow, within application program and specifically via edge 650 and in a direction shown by dashed line 655, to routine $t_2$ in block $P_2$. Thus, as one can appreciate, execution flow of the non-marked application program, as modified by our inventive technique to yield the watermarked program, will be repeatedly diverted from its normal path, i.e., that associated just with the non-marked program, to execute each of the inserted routines.

To further thwart detection of any inserted routine (such as routines $r_1$ through $r_4$), executable code that implements that routine (including appropriate jump instructions) can itself be diffused (scattered in a noncontiguous fashion, i.e., in noncontiguous locations) throughout an entire corresponding code block for a cluster, or even across multiple blocks for multiple clusters, in the non-marked application program rather than contiguously in an address space associated with or appended to a single block. Such scattering need not occur on an equal rate (e.g., two instructions of the inserted routine per every 200 instructions of the non-marked application program) throughout the block.

3. Hardware

Figure 7:
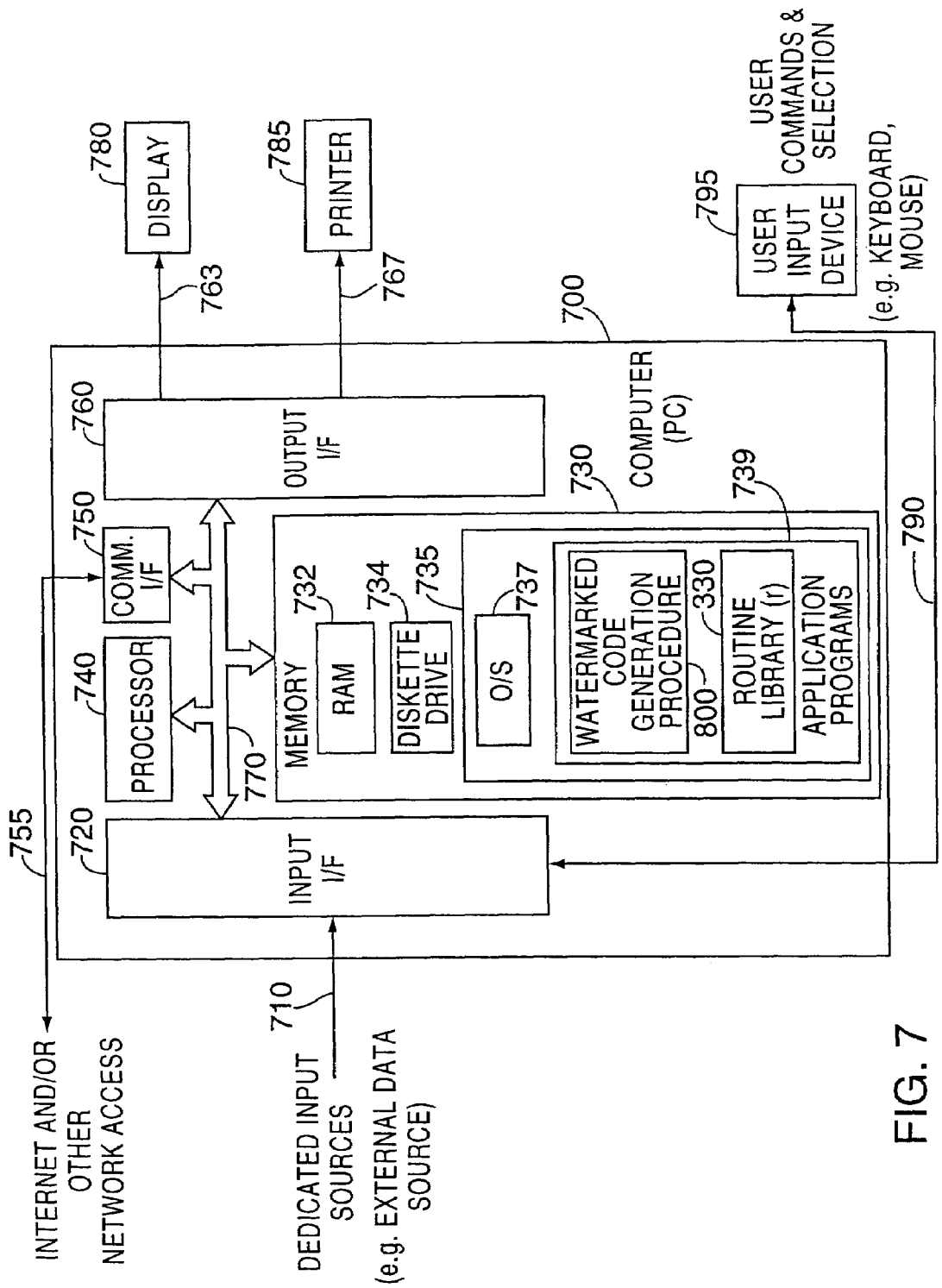
FIG. 7 depicts a high-level block diagram of computer system 700, illustratively a personal computer (PC), that can be used to implement our present invention.

FIG. 7 depicts a block diagram of PC 700 on which our present invention can be implemented.

As shown in FIG. 7, PC 700 comprises input interfaces (I/F) 720, processor 740, communications interface 750, memory 730 and output interfaces 760, all conventionally interconnected by bus 770. Memory 730, which generally includes different modalities, including illustratively random access memory (RAM) 732 for temporary data and instruction store, diskette drive(s) 734 for exchanging information, as per user command, with floppy diskettes, and nonvolatile mass store 735 that is implemented through a hard disk, typically magnetic in nature. Mass store 735 may also contain a CDROM or other optical media reader (not specifically shown) (or writer) to read information from (and write information onto) suitable optical storage media. The mass store stores operating system (O/S) 737 and application programs 739; the latter illustratively containing watermarked code generation procedure 800 (which incorporates our inventive technique) and routine library 330(r) (see FIG. 5). O/S 737, shown in FIG. 7, may be implemented by any conventional operating system, such as the WINDOWS NT operating system ("WINDOWS NT" is a registered trademark of Microsoft Corporation of Redmond, Wash.). Given that, we will not discuss any components of O/S 737 as they are all irrelevant. Suffice it to say, that application programs 739 execute under control of the O/S.

Incoming information can arise from two illustrative external sources: network supplied information, e.g., from the Internet and/or other networked facility, through network connection 755 to communications interface 750, or from a dedicated input source, via path(es) 710, to input interfaces 720. Dedicated input can originate from a wide variety of sources, e.g., via a dedicated link or an external source. In addition, input information can also be provided by inserting a diskette containing an input file(s) (G and H) of non-marked code and, where applicable, security code portions into diskette drive 734 from which computer 700 will access and read that file(s) from the diskette. Input interfaces 720 contain appropriate circuitry to provide necessary and corresponding electrical connections required to physically connect and interface each differing dedicated source of input information to computer system 700. Under control of the operating system, application programs 739 may exchange commands and data with the external sources, via network connection 755 or path(es) 710, to transmit and receive information, to the extent needed if at all, during program execution.

Input interfaces 720 also electrically connect and interface user input device 795, such as a keyboard and mouse, to computer system 700. Display 780, such as a conventional color monitor, and printer 785, such as a conventional laser printer, are connected, via leads 763 and 767, respectively, to output interfaces 760. The output interfaces provide requisite circuitry to electrically connect and interface the display and printer to the computer system. As one can appreciate, our present inventive software watermarking technique can be used to watermark any type of code regardless of the modalities through which PC 700 will obtain, store and/or communicate that code.

Furthermore, since the specific hardware components of PC 700 as well as all aspects of the software stored within memory 735, apart from the various software modules, as discussed below, that implement the present invention, are conventional and well-known, they will not be discussed in any further detail.

4. Software

Figures 9, 9B:
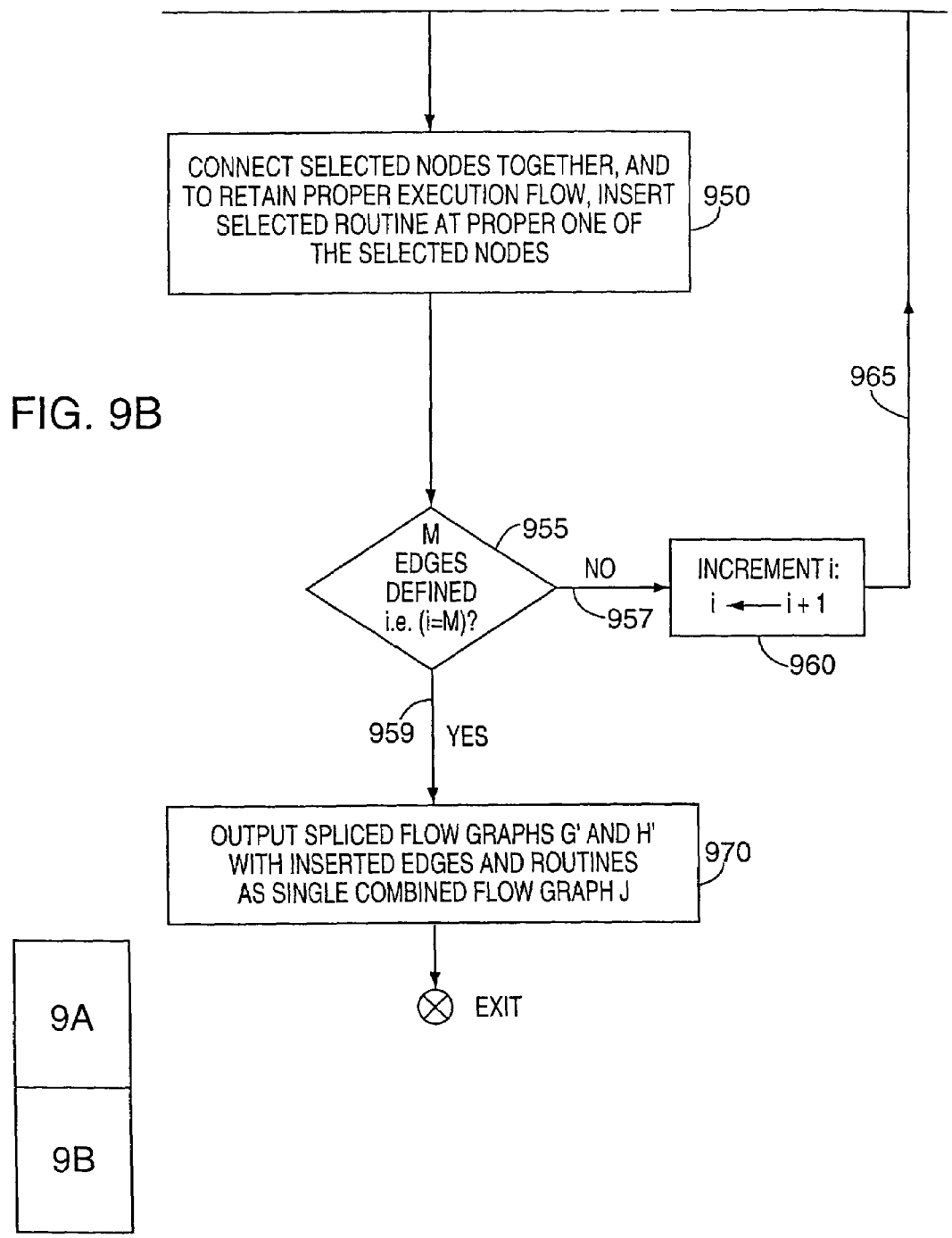
Figure 10:
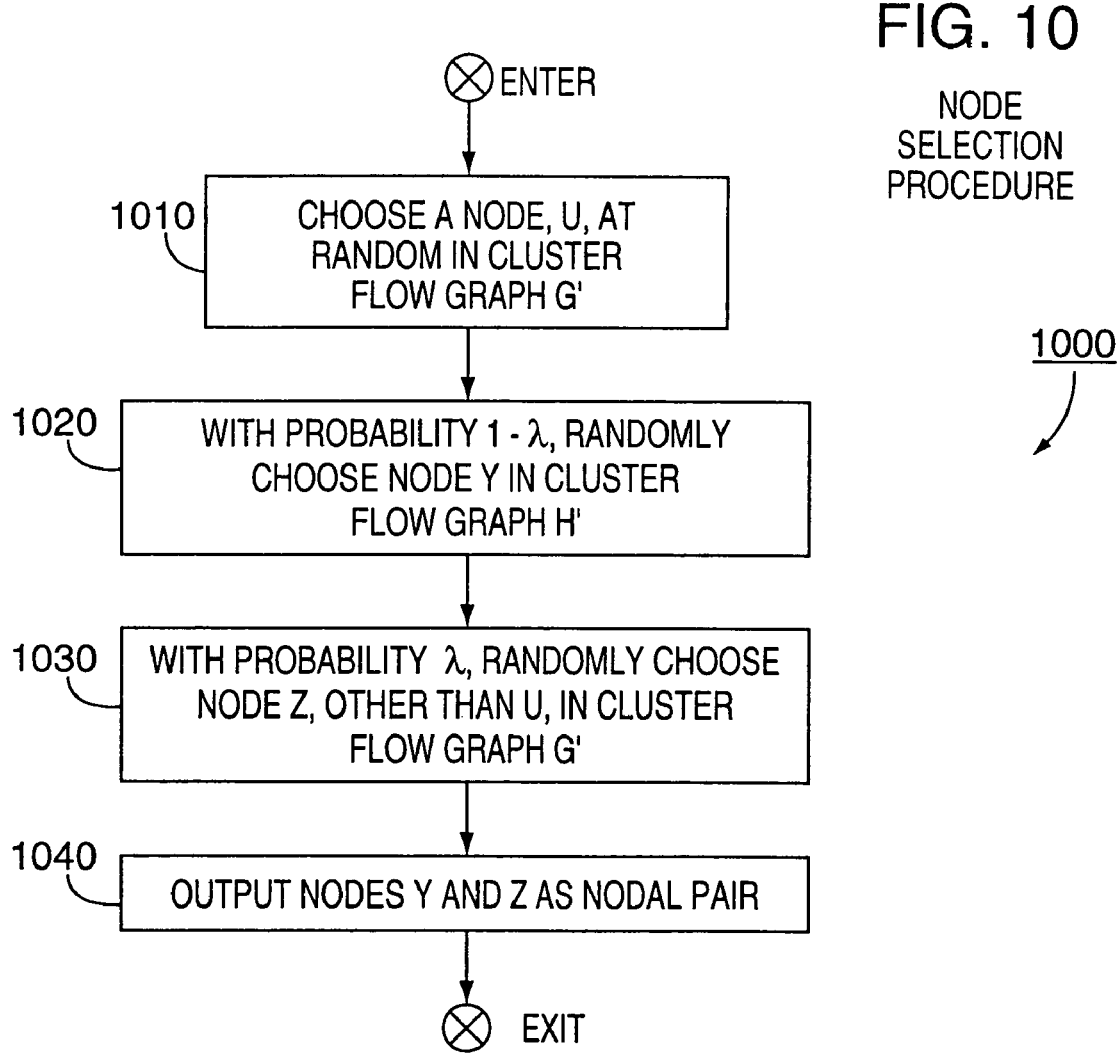
FIG. 10 depicts a flowchart of node selection procedure 1000 which is executed as part of procedure 900 shown in FIG. 9.

FIGS. 8–10 collectively depict high-level flowcharts of salient software procedures (modules), which execute on PC 700, for implementing our present invention, with specifically FIG. 8 depicting a high-level flowchart of watermarked code generation procedure 800. This process implements the process provided by watermarked code generation process 300 shown in FIG. 4. For ease of understanding, the reader should simultaneously refer to both FIGs. 4 and 8 throughout the following discussion.

Upon entry into procedure 800, execution first proceeds to block 810. This block, when executed, reads input values of secret parameters k, M and λ. Thereafter, execution proceeds to block 820 which reads input code portion G and then performs flow analysis on that portion to yield corresponding flow graph $\tilde{G}$. Once this flow graph is fully produced, then execution proceeds to block 830 which reads input code portion H and then performs flow analysis on that portion to yield corresponding flow graph $\tilde{H}$. Blocks 820 and 830 implement flow analysis operations 413 and 417, respectively. After cluster flow graph $\tilde{H}$ is fully produced, block 840 is executed to k-partition flow graph $\tilde{G}$ into cluster flow graph G'. Thereafter, block 850 is executed to k-partition flow graph $\tilde{H}$ into cluster flow graph H'. Blocks 840 and 850 implement k-partitioning operations 423 and 427, respectively. Once block 850 fully executes, execution then proceeds to block 860.

Block 860, when executed, invokes edge insertion procedure 900 (to be discussed below in conjunction with FIGS. 9A and 9B) to randomly insert M separate edges and routines collectively between clusters in graphs G' and H', and, if desired, different clusters solely within each of graphs G' and H', to yield single combined flow graph J. This procedure, which implements edge definition operation 440, provides: random selection of nodes in both and, where desired, either one of the cluster flow graphs G' and H' to form nodal pairs; insertion of edges to connect each such nodal pair; and selection of a proper routine for insertion along the edge defined by each nodal pair and selection of a particular node in that pair at which that routine is to be inserted.

Once procedure 900 fully executes, execution proceeds to block 870, which implements code generator 460. This block, using input code portions G and H, and library 330, constructs executable code corresponding to the representation depicted in combined flow graph J. In addition, block 870 distributes, as noted above, the code for the individual inserted routines approximately uniformly throughout the executable code. Once this executable code is fully generated, execution passes to block 880 which simply provides this code as output watermarked code. Thereafter, execution exits from procedure 800.

FIGS. 9A and 9B collectively depict a high-level flowchart of edge insertion procedure 900 that is executed as part of procedure 800 shown in FIG. 8; the correct alignment of the drawing sheets for FIGS. 9A and 9B is shown in FIG. 9.

As shown in FIGS. 9A and 9B, upon entry into routine 900, execution first proceeds to block 905 which, when executed, initializes contents of counter i to one. Thereafter, execution proceeds to a loop formed of blocks 910 through 960 to: randomly select nodes that are to form nodal pairs; select a proper routine for insertion at an edge defined by each such nodal pair and select a particular node in that pair at which that routine is to be inserted; and connect the nodes in each pair together to form M separate edges.

In particular, upon entry into this loop, execution first proceeds to block 910. This block, when executed, selects a specific flow graph(s) to which edge(i) is to be added such that edges (links) are added to all such graphs in accordance with corresponding pre-defined distributions. Illustratively, such distributions may call for approximately the same number of edges to be inserted that span both cluster flow graphs as are collectively contained solely within graph G' and within graph H', or a different allocation of edges between and within each of graphs. The specific distributions that are used, in any one instance, are not critical provided that an adequately large number of edges is inserted that span both cluster flow graphs G' and H' so as to yield a sufficiently complex flow pattern that thwarts third party detection of the complete watermark. Moreover, since all edges are effectively chosen at random, then the edges can be inserted in essentially any order between both flow graphs and, where appropriate, solely within either of the flow graphs. Once appropriate graph(s), such as both G' and H' or solely G' or solely H', are selected for edge(i), then execution proceeds to decision block 915. This block appropriately routes execution based on the selected graph(s). In particular, if edge(i) is to be inserted solely within graph G', then decision block directs execution, via path 916, to block 925. Block 925 selects, typically randomly, two nodes in graph G', though with each node in a different cluster, as endpoints for edge(i). Alternatively, if edge(i) is to be inserted that spans both graphs G' and H', then decision block directs execution, via path 918, to block 930. Block 930 selects, typically randomly and illustratively through invoking node selection procedure 1000 (to be discussed below in conjunction with FIG. 10), two nodes, one in graph G' and the other in graph H' as endpoints for edge(i). Lastly, if edge(i) is to be inserted solely within graph H', then decision block directs execution, via path 922, to block 935. Block 935 selects, typically randomly, two nodes in graph H', though with each such node in a different cluster, as endpoints for edge(i). In any instance, a node can be common to two inserted edges. Thereafter, after block 925, 930 or 935 executes, execution proceeds, via corresponding path 936, 938 or 942, to block 945. Also, once appropriate nodal pairs have been selected, in the manner described above, further pairs can be selected by randomly picking a pair of nodes from a union of the graphs G' and H' to yield further edges.

Block 945 selects, for edge(i) and particularly with respect to the location of each node in this edge in the corresponding program flow, an appropriate routine from library 330 (see FIG. 3) that is to be inserted along this edge. Once this routine is selected, execution proceeds to block 950, as shown in FIGS. 9A and 9B. This block, when executed, connects the nodal pair for edge(i) together to effectuate this edge, and selects one of these two nodes in one flow graph as an insertion point for the selected routine, such that this routine causes minimal, if any, adverse affect on execution flow. Typically, where an inserted routine is to be invoked when program execution reaches one node in a nodal pair, a call (or jump instruction) to that routine will be located at that node but with executable code for that routine being situated at the opposite node in that pair. Once block 950 fully executes, execution proceeds to decision block 955 which determines, based on current contents of counter i, whether all M edges have been defined. Specifically, if the contents have a value less than M, then decision block 955 routes execution, via NO path 957, to block 960. This latter block increments the contents of the counter by one. Thereafter, execution loops back, via path 965, to block 910 to select appropriate flow graph(s) for the next edge, and so forth. Alternatively, if the current value of counter i equals M, then all M edges have been generated; hence, decision block 955 routes execution, via YES path 959, to block 970. This latter block, when executed, provides, as output, single combined flow graph J that through addition of edges and routines has effectively spliced together graphs G' and H'. Thereafter, execution simply exits from routine 900.

FIG. 10 depicts a flowchart of node selection procedure 1000, which is executed as part of procedure 900 shown in FIG. 9. This procedure implements an illustrative heuristic for selecting two nodes in a nodal pair that is to span graphs G' and H'.

Upon entry into routine 1000 shown in FIG. 10, execution first proceeds to block 1010. This block, when executed, randomly picks a node, U, in cluster flow graph G'. Thereafter, execution proceeds to block 1020. Here, with λ being pre-defined as equaling (a number of edges that are to transit between G' and H')/(a number of edges connected to U), block 1020 randomly selects, with a probability of 1λ, a node, Y, in graph H'. Then, block 1030 randomly chooses, with a probability of λ, a node, Z other than U, in graph G'. Once this occurs, block 1040 executes to provide, as output, the designations of two nodes Y and Z as a nodal pair. Thereafter, execution exits from procedure 1000.

Nodal pairs may be selected using any one of many different ways, apart from that shown in FIG. 10 and discussed above. Another such way involves using bipartitie graphs. In particular, we note here that the graphs G' and H' may have clusters which may be unequal in number. From graph G', pick a pre-determined number of nodes, for each cluster, which need not be all equal. Let the number of nodes be L. Then, similarly pick L' (often a pre-determined number, but possibly given by a probabilistic distribution) nodes from graph H'. Now, construct a random bipartitie graph with the L and L' nodes as independent sets and with an average degree of each node being small and pre-determined. Then, add edges among the nodes in both of the independent sets using any standard method of random graph generation, once again keeping average degree small and, for example, comparable to average degree of the nodes in the original graphs G' and H'.

The number of edges that connect to U is implied by the process above. Generally speaking, the total number of edges to be added is selected based, generally qualitatively, on how much tamper-resistance is desired while not making code growth too large or a performance penalty too significant. Thus, one must avoid inserting edges into busy sections of unmarked code (e.g., inner body of a loop). Fortunately, such "busy" sections can be readily detected using standard software profiling techniques.

Though we described our invention in terms of watermarking software intended for use with a PC, our invention is clearly not so limited in its application. In that regard, the present invention can be used to impart tamper-resistance to any program code designed to execute on nearly any type of computer, not just a PC. Such other types of computers illustratively include workstations, minicomputers, mainframe computers, and specialized computers such as industrial controllers and telephony switching system computers.

The various secrets, e.g., the values k, M and λ, as described above, for detecting the watermark may be contained in a secure processor that has secure memory (whose contents can not be altered or inferred) and is capable of secure execution (i.e., it executes given code, in such a way that its execution cannot be altered). Alternately, this processing can be implemented using O/S features in software. Another possibility is that secure memory and secure execution can be simulated in software such that the protected object will be self-enforcing.

While we have described the inserted routines as providing functionality (operations) required by the protected program and terminating that program if any one such routine were to be removed by a third party adversary, the routines are clearly not so limited in their use. In that regard, one or more of the inserted routines can provide functionality totally unrelated to, having no affect on and completely separate from that provided by the protected program. Such functionality can include restricting access to the protected program or other protected object. See, e.g., that described in co-pending United States patent application "Passive and Active Software Objects Containing Boreresistant Watermarking", Ser. No. 09/315,733, filed May 20, 1999 and assigned to the same assignee hereof, which is incorporated by reference herein.

Use of the present invention advantageously permits a standalone feature, such as a general security function, as implemented by one or more of the routines, to be easily and securely integrated into any non-marked computer program. In fact, many different functions could be added to a single non-marked program.

For example, if the watermark program is an application program designed to execute under a certain operating system(s), then one inserted routine could establish a network connection over, e.g., the Internet, and then transmit, over that connection, a hardware identifier for a user computer to a manufacturer of an operating system then executing on that computer; and then, in return, receive, from the software manufacturer and store in, e.g., and O/S registry, an install identifier containing a signed version of the machine identifier. Another such routine could subsequently access the hardware identifier and compare that identifier to the one contained in the install identifier. If both matched, program execution would proceed unaffected under the O/S. Alternatively, if a mismatch were detected, such as would arise if an image of the O/S were to have been copied to and is now executing on another computer (which would inherently contain a different hardware identifier), then the routine could inform the O/appropriately and display a warning message and instruct the O/S to cease further execution of any application programs.

Clearly, a myriad number of other standalone security functions and/or other nonsecurity features could be implemented by corresponding routine(s) inserted into non-marked executable code through our inventive watermarking technique. By binding these routines very tightly to the non-marked program and with randomized insertion into and throughout the program, these features will collectively exhibit an extremely complex control flow. This flow complexity will significantly frustrate a third party adversary, who uses conventional software analysis tools, in detecting and circumventing all the functions and features implemented by the inserted routines.

In addition, though we have described our inventive technique as utilizing two separate input code portions and generating a partitioned flow graph for each such portion, our inventive technique, with readily apparent simplifications, will function in those situations where only one such input code portion is used. In this case, edges and accompanying routines would be inserted along edges defined by randomly selected nodal pairs spanning different (and/or even the same) clusters in just one partitioned flow graph for that input code portion. The result would be a watermark that is likely to be simpler, and hence easier for an adversary to discern and thus less optimal, than that attained through use of two separate input code portions. Furthermore, our inventive technique could also be used to insert edges and routines among more than two separate input code portions, e.g., three or more, if desired. However, the complexity of the overall processing to accomplish this result may be excessive for the marginal benefits that could be gained. In that regard, we believe that use of two separate input code portions will suffice to create a watermark that is sufficiently immune to adversarial detection and circumvention through use of conventional flow analysis techniques.

Moreover, though the flow graphs are described as showing control/data flow on an instruction-based level for an unmarked program and hence insertion of executable routines at an "instructional" level, where security restraints can be considerably loosened, such flow graphs can be based on control/data flow that occurs at a higher level, such as on a block-by-block basis, with each node representing a routine or other execution block formed of a group of instructions, with insertion of such routines occurring at that level.

Furthermore, though we have described our invention in the context of software-implemented objects, whether in the specific context, as described above, of executable software code or as noted above, a data object, such as, e.g., an audio or video file, these objects can also be hardware-related. In that regard, a design of an integrated circuit, such as a dedicated logic chip or other digital processing device that embodies a predefined operational flow, whether it be in a parallel, pipelined or sequential fashion, in which resulting operations and accompanying control/data flow can be graphically depicted as nodes with interconnection edges, can be viewed as such an object and hence encompassed within this term. Through use of a suitable set of library routines, which, in a similar fashion to library of routine(s) discussed above, implement added functionalities and randomized edge addition procedures, such as those discussed above, a resulting graph will be generated such that, from a standpoint of input/output functionality which the chip or device is intended to implement, is functionally equivalent thereto but advantageously of significantly increased complexity and hence significantly increased difficulty to decipher from analysis of the input/output behaviour of the chip or device. The resulting graph would contain a watermarked object generated through use of our invention.

Although one embodiment which incorporates the teachings of the present invention has been shown and described in detail herein, those skilled in art can readily devise many other embodiments, modifications and applications of the present invention that still utilize these teachings.

We claim:

1. Apparatus for forming an identifier for an input object and for securely marking the input object with the identifier so as to yield a marked object, apparatus comprising:
   means for storing computer executable instructions therein;
   means for performing acts, in response to the stored executable instructions, the acts comprising:
      generating a flow representation for the input object, the representation having a plurality of nodes, said nodes representing pre-defined first operations performed by the input object, and connections among the nodes signifying associated flow among the pre-defined first operations performed by the input object;
      randomly selecting first and second nodes from the plurality of nodes in the representation so as to form a pre-defined number of nodal pairs, each of said pairs having one of the first nodes and a corresponding one of the second nodes;
      for each of the nodal pairs, forming an executable procedure associated with each of the nodal pairs by establishing flow between the first and second nodes in said each nodal pair and inserting, in the flow so established, a selected one of a plurality of different pre-defined second operations so as to collectively define the marked object, whereby the marked object implements the pre-defined first operations and a plurality of selected ones of the pre-defined second operations, each of which has been randomly spliced into flow of the input object, wherein the identifier collectively comprises all ones which differ within the plurality of pre-defined second operations, and execution flow associated therewith and involving the nodal pairs;

inserting a pre-defined number of separate links and designations for selected ones of the procedures into the flow representation so as to yield a combined flow representation; and converting, in response to said input executable code and executable code for said selected ones of the procedures, said combined flow representation into output executable code, said output executable code being the marked code;

wherein:

the input object comprises a software object which comprises, input executable code, at least one instruction in the input executable code being associated with a corresponding one of the pre-defined first operations, and executable code for a corresponding executable procedure being associated with each selected one of the pre-defined second operations;

the input executable code comprises first and second portions thereof and the flow representation comprises first and second separate flow representations for the first and second portions of the input executable code, respectively;

the first portion of the input executable code comprises at least a pre-defined portion of a non-marked application program; and the second portion of the input executable code comprises a remaining portion of the non-marked application program or pre-defined executable security code.

2. Apparatus in claim 1 wherein the means for performing acts, in response to the stored instructions, inserts executable code for a selected one procedure in noncontiguous locations in the input executable code.

3. Apparatus in claim 1 wherein the means for performing acts, in response to the stored instructions, selects a procedure from a pre-defined library of stored routines wherein said procedure is one of the stored routines.

4. Apparatus in claim 1 wherein each of the inserted procedures implements, when executed, a pit-defined function such that if any of said inserted procedures is removed from the marked code, the marked code, when subsequently executed, will terminate its execution.

5. Apparatus in claim 1 wherein at least one of the inserted procedures implements, when executed, a pre-defined function which is independent of functionality provided by the non-marked application program.

6. Apparatus in claim 1 wherein the security code provides functionality independent of any functionality provided by application program.

7. Apparatus in claim 1 wherein the means for performing acts, in response to the stored instructions, performs additional acts comprising:

(a) generates first and second separate flow representations for the first and second portions of the input executable code;

(b) partitions each of the first and second flow representations into k clusters each so as to yield first and second cluster flow representations, respectively (where k is a pre-defined integer);

(c) randomly selects the first and second nodes in the first and second cluster flow representations, respectively, so as to form a corresponding one of the nodal pairs;

(d) inset a designation for a selected executable procedure at a first node in the nodal pair; and (e) repeats operations (c) and (d) a pre-defined number of times so as to insert a pre-defined number of separate procedures into the first and second flow representations so as to yield the combined flow representation.

8. Apparatus in claim 7 wherein the means for performing acts, in response to the stored instructions, inserts executable code for a selected one procedure in noncontiguous locations in the input executable code.

9. Apparatus in claim 7 wherein the means for performing acts, in response to the stored instructions, selects a one procedure from a pre-defined library of stored routines, wherein said one procedure is one of the stored routines.

10. Apparatus in claim 7 wherein each of the inserted procedures implements, when executed, a pre-defined function such that if any of said inserted procedures is removed from the marked code, the marked code, when subsequently executed, will terminate its execution.

11. Apparatus in claim 7 wherein at least one of the inserted procedures implements, when executed, a pre-defined function which is independent of functionality provided by the non-marked application program.

12. Apparatus in claim 7 wherein the means for performing acts, in response to the stored instructions, performs additional acts comprising:

randomly selects a node, U, in the first cluster flow representation;

randomly selects, with probability 1−$\lambda$ (where $\lambda$ is a pro-defined value with $0 \leq \lambda \leq 1$), a node Y in the second cluster flow representation;

randomly selects, with probability $\lambda$, a node Z, other than U, in the first cluster flow representation; and provides designations of nodes Y and Z as the nodes forming the nodal pair.

13. Apparatus in claim 7 wherein the means for performing acts, in response to the stored instructions, randomly selects the first and second nodes from different clusters solely within the first cluster flow representation or from different clusters solely within the second cluster flow representation.

14. One or more computer-readable media having computer-executable instructions that, when executed by a computer, perform acts for forming an identifier for input executable code and for securely marking the input executable code with the identifier so as to yield marked code, the acts comprising:

generating a flow representation for the input object, the representation having a plurality of nodes, said nodes representing pre-defined first operations performed by the input object, and connections among the nodes signifying associated flow among the pre-defined first operations performed by an input object;

randomly selecting first and second nodes from the plurality of nodes in the representation so as to form a pre-defined number of nodal pairs, each of said pairs having one of the first nodes and a corresponding one of the second nodes;

for each of the nodal pairs, forming an executable procedure associated with each of the nodal pairs by establishing flow between the first and second nodes in said each nodal pair and inserting, in the flow so established, a selected one of a plurality of different pre-defined second operations so as to collectively define the marked object whereby the marked object implements the pre-defined first operations and a plurality of selected ones of the pre-defined second operations, each of which has been randomly spliced into flow of the input object, wherein the identifier collectively comprises all ones which differ within the plurality of pry-defined second operations, and execution flow associated therewith and involving the nodal pairs;

inserting a pre-defined number of separate links and designations for selected ones of the procedures into the flow representation so as to yield a combined flow representation; and converting, in response to said input executable code and executable code for said selected ones of the procedures, said combined flow representation into output executable code, said output executable code being the marked code;

wherein:

the input object comprises a software object which comprises input executable code, at least one instruction in the input executable code being associated with a corresponding one of the pre-defined first operations, and executable code for a corresponding executable procedure being associated with each selected one of the pre-defined second operations;

the input executable code comprises first and second portions thereof and the flow representation comprises first and second separate flow representations for the first and second portions of the input executable code, respectively;

the first portion of the input executable code comprises at least a pre-defined portion of a non-marked application program; and the second portion of the input executable code comprises a remaining portion of the non-marked application program or pre-defined executable security code.

15. One or more media as recited in claim 14 further comprising selecting a procedure from a pre-defined library of stored routines, wherein said procedure is one of the stored routines.

16. One or more media as recited in claim 14 further comprising inserting executable code for a selected one procedure in noncontiguous locations in the input executable code.

17. One or more media as recited in claim 14 wherein each of the inserted procedures implements, when executed, a pre-defined function such that if any of said inserted procedures is removed from the marked code, the marked code, when subsequently executed, will terminate its execution.

18. One or more media as recited in claim 14 wherein at least one of the inserted procedures implements, when executed, a pre-defined function which is independent of functionality provided by the non-marked application program.

19. One or more media as recited in claim 14 wherein the security code provides functionality Independent of any functionality provided by application program.

20. One or more computer-readable media having computer-executable instructions that, when executed by a computer, perform acts for forming an identifier for input executable code and for securely marking the input executable code with the identifier so as to yield marked code, the acts comprising:

generating a flow representation for the input object, the representation having a plurality of nodes, said nodes representing pre-defined first operations performed by the input object, and connections among the nodes signifying associated flow among the pre-defined first operations performed by an input object;

randomly selecting first and second nodes from the plurality of nodes in the representation so as to form a pre-defined number of nodal pairs, each of said pairs having one of the first nodes and a corresponding one of the second nodes;

for each of the nodal pairs, forming an executable procedure associated with each of the nodal pairs by establishing flow between the first and second nodes in said each nodal pair and inserting, in the flow so established, a selected one of a plurality of different pre-defined second operations so as to collectively define the marked object, whereby the marked object implements the pre-defined first operations and a plurality of selected ones of the pre-defined second operations, each of which has been randomly spliced into flow of the input object, wherein the identifier collectively comprises all ones which differ within the plurality of pre-defined second operations, and execution flow associated therewith and involving the nodal pairs;

inserting a pre-defined number of separate links and designations for selected ones of the procedures into the flow representation so as to yield a combined flow representation;

converting, in response to said input executable code and executable code for said selected ones of the procedures, said combined flow representation into output executable code, said output executable code being the marked code;

generating first and second separate flow representations for the first and second portions of the input executable code;

partitioning each of the first and second flow representations into k clusters each so as to yield first and second cluster flow representations, respectively (where k is a pre-defined integer);

randomly selecting the first and second nodes in the first and second cluster flow representations, respectively, so as to form a corresponding one of the nodal pairs;

inserting a designation for a selected executable procedure at a first node in the nodal pair; and repeating a pre-defined number of times steps "randomly selecting the first and second nodes" and "inserting a designation" so as to insert a pre-defined number of separate procedures into the first and second flow representations so as to yield the combined flow representation;

wherein:

the input object comprises a software object, which comprises input executable code, at least one instruction in the input executable code being associated with a corresponding one of the pre-defined first operations, and executable code for a corresponding executable procedure being associated with each selected one of the pre-defined second operations;

the input executable code comprises first and second portions thereof and the flow representation comprises first and second separate flow representations for the first and second portions of the input executable code, respectively;

the first portion of the input executable code comprises at least a pre-defined portion of a non-marked application program; and the second portion of the input executable code comprises a remaining portion of the non-marked application program or pry-defined executable security code.

21. One or more media as recited in claim 20 further comprising inserting executable code for the selected one procedure in noncontiguous locations in the input executable code.

22. One or more media as recited in claim 20 further comprising selecting the procedure from a pre-defined library of stored routines, wherein said procedure is one of the stored routines.

23. One or more media as recited in claim 20 wherein each of the inserted procedures implements, when executed, a pre-defined function such that if any of said inserted procedures is removed from the marked code, the marked code, when subsequently executed, will terminate its execution.

24. One or more media as recited in claim 20 wherein, at least one of the inserted procedures implements, when executed, a pre-defined function which is independent of functionality provided by the non-marked application program.

25. One or more media as recited in claim 20 wherein the first and second nodes randomly selecting step comprises:

randomly selecting a node, U, in the first cluster flow representation;

randomly selecting, with probability $1-\lambda$ (where $\lambda$ is a pre-defined value with $0 \leq \lambda \leq 1$), a node Y in the second cluster flow representation;

randomly selecting, with probability $\lambda$, a node Z, other than U, in the first cluster flow representation; and providing designations of nodes Y and Z as the nodes forming the nodal pair.

26. One or more media as recited in claim 20 wherein the first and second nodes randomly selecting step comprises the step of randomly selecting the first and second nodes from different clusters solely within the first cluster flow representation or from different clusters solely within the second cluster flow representation.

* * * * *